(12) United States Patent
Grundmann et al.

(10) Patent No.: US 7,004,042 B2
(45) Date of Patent: Feb. 28, 2006

(54) SENSOR AND METHOD FOR THE PRODUCTION THEREOF

(75) Inventors: Wolfgang Grundmann, Birkenwerder (DE); Remo Nägele, Berlin (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/498,287

(22) PCT Filed: Dec. 2, 2002

(86) PCT No.: PCT/DE02/04401

§ 371 (c)(1),
(2), (4) Date: Aug. 20, 2004

(87) PCT Pub. No.: WO03/054496

PCT Pub. Date: Jul. 3, 2003

(65) Prior Publication Data

US 2004/0261552 A1    Dec. 30, 2004

(30) Foreign Application Priority Data

Dec. 6, 2001    (DE) ................................ 101 59 869

(51) Int. Cl.
*G01D 21/00* (2006.01)
*G01K 1/00* (2006.01)
(52) U.S. Cl. .................................... 73/866.5; 374/208
(58) Field of Classification Search ............... 73/866.5; 374/208, 144
See application file for complete search history.

(56) References Cited

U.S. PATENT DOCUMENTS

| 3,788,143 A | 1/1974 | Gabriel | 374/144 |
| 5,342,126 A | 8/1994 | Heston et al. | 374/208 |
| 5,733,044 A * | 3/1998 | Rose et al. | 374/144 |
| 5,829,880 A | 11/1998 | Diedrich | 374/208 |
| 2005/0155442 A1 * | 7/2005 | Grundmann | 73/866.5 |

FOREIGN PATENT DOCUMENTS

| DE | 195 04 820 | 7/1996 |
| DE | 195 28 474 | 2/1997 |
| DE | 38 12 182 | 5/1997 |
| DE | 196 07 986 | 9/1997 |
| DE | 199 63 912 | 6/2001 |
| EP | 0 508 891 | 4/1992 |
| EP | 0 794 417 | 2/1997 |

* cited by examiner

*Primary Examiner*—Hezron Williams
*Assistant Examiner*—Tamiko Bellamy
(74) *Attorney, Agent, or Firm*—Fish & Richardson P.C.

(57) ABSTRACT

A sensor arrangement includes a sensor having a sensor body, a lockable arm on the sensor body, where the lockable arm is flexible, and an encoding element on the lockable arm. The arrangement includes a housing that has a bore with two sides, one of which has a recess. The sensor is inside the bore such that the encoding element is inside the recess and such that the lockable arm locks to an edge of the housing.

20 Claims, 2 Drawing Sheets

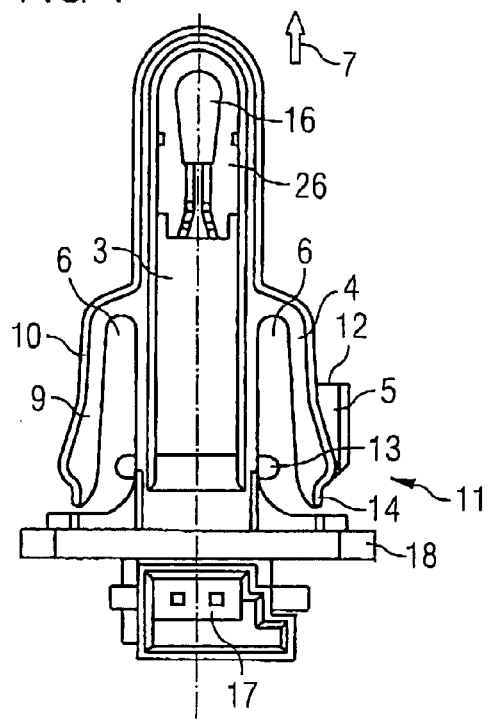
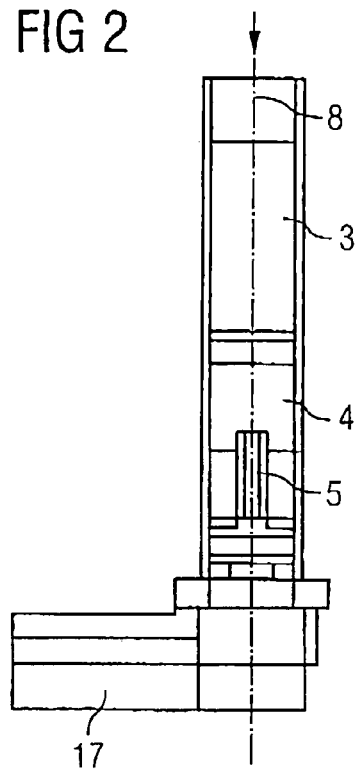
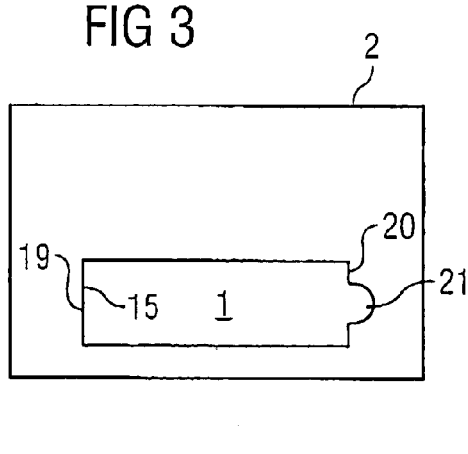
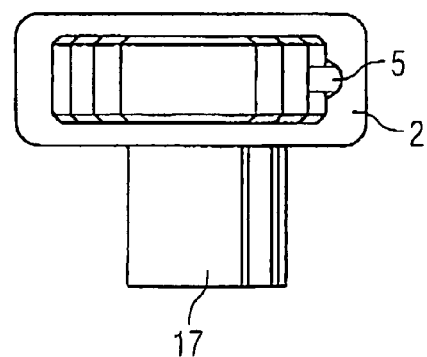

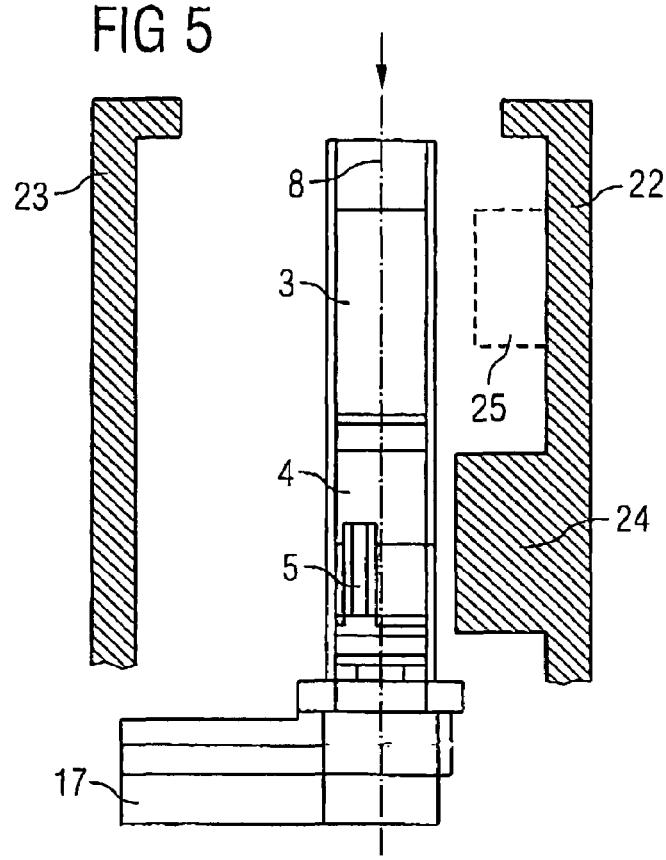
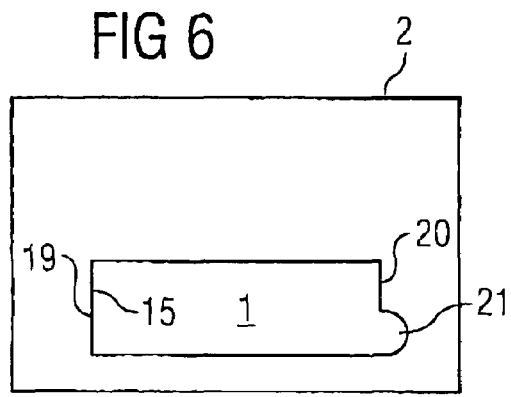
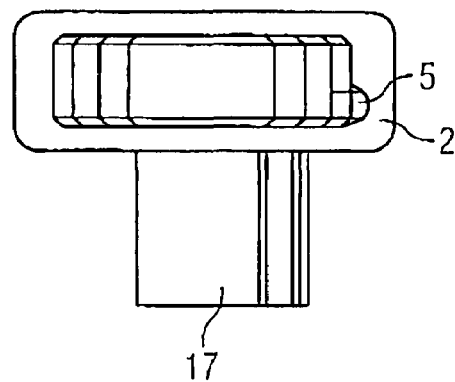

SENSOR AND METHOD FOR THE PRODUCTION THEREOF

BACKGROUND

The invention relates to a sensor having a sensor body, on which a lockable arm is arranged, and having an encoding element for defining the insertion direction. The invention also relates to a method for manufacturing the sensor, as well as a sensor arrangement in a housing.

Sensors, as mentioned above, are known from the state of the art, in which the lockable arms are arranged in a plane. An encoding element is arranged in a plane that is perpendicular to that plane. Such sensors may be inserted in housing bores with encoding and may be locked there. Also, the housing bore features an additional recess that serves for encoding, thus for defining the insertion direction of the sensor in the housing. The sensor may be inserted into the housing only if the code on the sensor body is in the same place as the code on the housing bore.

Such sensors are used, for example, as temperature sensors. Temperature sensors have an NTC temperature sensor element at one end of the sensor body. At the other end of the sensor, a contacting device is provided, which connects cables leading from the outside to the sensor with the sensor element in an electrically conductive manner. Such sensors can, for example, be inserted from the outside into air conditioners housings, where they are then used for measuring the temperature in the air conditioner.

The lockable arms serve to secure the sensor in the housing.

The known sensors have the disadvantage that the manufacture of the sensor body by inexpensive injection molding is possible only in a relatively complicated manner, because of the arrangement of the lockable arm and the encoding. The sensors must be designed in two parts in the form of the so-called "hinged sensors". In the process, the upper half and the lower half of the sensor are manufactured as if folded open. The two halves are connected to each other by an integral hinge and are assembled as one sensor body by folding them together.

SUMMARY

The task of the present invention is therefore to describe an insertable sensor that is easy and inexpensive to manufacture.

This aim is achieved by an insertable sensor according to claim 1. Advantageous embodiments of the sensor as well as a sensor arrangement in a housing are shown in the remaining claims.

A sensor suitable for being inserted in the bore of a housing and having a sensor body is indicated. A flexible lockable arm is arranged on the sensor. The sensor also has an encoding element arranged on the lockable arm.

By arranging the encoding element on the lockable arm of the sensor, it becomes possible to manufacture the sensor simply and inexpensively in one piece, by injection molding. Such manufacture may, for example, be in the form of a mold formed by two halves. The mold parting line is in the plane in which the lockable arm flexes. The use of slide valves, as are necessary for molding the special cavities in the known sensors, can be dispensed with. Rather, it becomes possible to manufacture cavities or free spaces under the flexible lockable arm in the form of integrated projections. The two halves forming the mold can be easily parted after injection molding.

The lockable arm may be arranged on the narrow side of the sensor. This has the advantage that the encoding element is also located on the narrow side of the sensor. This makes it easy to comply with the customer specifications required recently, because according to these specifications, the code in the housing is often located on the narrow side of the housing bore.

There is also a free space between the lockable arm and the sensor body, for flexing the lockable arm toward the inside. This has the advantage that the lockable arm can be flexed easily toward the inside, without impediment by the sensor body. This flexing toward the inside is necessary if the sensor is to be inserted into the bore of a housing, together with the lockable arm. The lockable arm must be flexible toward the inside, in order to be able to lock into place.

It is also an advantage if the lockable arm has an outer edge running toward the inside at a slant to the insertion direction. With such an outer edge, the lockable arm can be pushed along the edge of a housing bore. The slant means that the inside force exerted on the lockable arm towards the inside increases slowly, making for an insertion process that can be easily controlled.

The sensor may be manufactured by injecting a plastic into a mold made of two halves. In this process the mold parting line between the two halves may run in the plane in which the lockable arm flexes, enabling the two advantages described above to come into play.

The encoding element may extend parallel to the plane of the mold parting line. In another embodiment of the sensor, the encoding element may also extend in the plane of the mold parting line. This increases the flexibility in the use of the sensor.

In an advantageous embodiment of the sensor, the encoding element may be located on the exterior of the lockable arm, making it simple to mold the encoding element in such a way that it protrudes above the outline of the sensor body, and thus can fulfill its encoding function.

In another embodiment of the sensor, a second lockable arm can be provided on the side of the sensor body opposite the lockable arm, yielding an essentially symmetrical design of the sensor that is locked into the bore of a housing by lockable arms after insertion, and is therefore mechanically more stable.

Moreover, the encoding element may be a projection protruding beyond the outline of the sensor, as seen counter to the insertion direction. This projection may, for example, have the shape of a rib.

Furthermore, the encoding element may have a border at its front end, as seen from the insertion direction, running perpendicular to the insertion direction and in the flex direction of the lockable arm. Such a border running in the flex direction has the advantage that a deterioration of the encoding through flexing back the lockable arm, and insertion into a housing in an unplanned direction can be avoided. The border running perpendicular to the insertion direction and in the flex direction also means that there is no starting incline in the encoding element, thereby preventing insertion of the sensor in the wrong orientation, with a great degree of certainty.

Furthermore, an end stop can be provided on the sensor body, to limit the flex range of the lockable arm. The limitation of the flex range of the lockable arm has the advantage of preventing the encoding element from being pushed completely inside when the lockable arm flexes in, and thereby no longer fulfilling its encoding function.

In the process, it is of advantage if the encoding element is designed in such a way that it protrudes beyond the outline of the sensor body even if the lockable arm is pushed toward the inside up to the end stop, as seen counter to the insertion direction. In this way, it retains its encoding function even if the lockable arm is completely pushed in.

A recess may be provided at the back end of the lockable arm, as seen from the insertion direction, which is suitable to accommodate an edge of a housing, ensuring a secure lock of the sensor body with the housing.

The lockable arm may extend from the sensor body counter to the insertion direction, ensuring a secure lock of the lockable arm with the housing.

Furthermore, a sensor is indicated in which a sensor element is located at the front end of the sensor body as seen from the insertion direction, and in which also a contacting device for cables is provided at the back end of the sensor body as seen from the insertion direction. The sensor element is connected with the contacting device in an electrically conductive manner.

Such a sensor has the advantage that it can be contacted electrically from the outside via a plug or via a terminal connection, after installation of the sensor in a housing with the sensor elements integrated in the front end of the sensor. The electrical contact serves, in this connection, to read the sensor signals supplied by the sensor element.

Furthermore, a flange may be arranged between the lockable arm and the contacting device, which flange helps to better seal the connection between the sensor body and the housing.

Furthermore, a sensor arrangement is indicated, in which a housing is provided in addition to the sensor described above, which housing has a bore with two narrow sides. The housing also has an additional encoding recess arranged on one of the narrow sides. The sensor is inserted through the encoding recess with its encoding element, and the lockable arm interlocks with an edge of the housing.

Such a sensor arrangement has the advantage that a sensor that can be manufactured in one piece by simple injection molding can be inserted into the housing securely and correctly.

Furthermore, a method for manufacturing a sensor is indicated, whereby the sensor is manufactured in two halves by injection molding of a plastic. The two halves have projections protruding toward the interior of the mold forming the free space(s) necessary for flexing the lockable arms. The projections may be made of metal, in particular steel.

In the following, the invention is explained in more detail by way of exemplary embodiments and the respective illustrations.

DESCRIPTION OF THE DRAWINGS

FIG. 1 shows an example of a sensor in a first side view.

FIG. 2 shows the sensor of FIG. 1 in a second side view.

FIG. 3 shows a housing for inserting the sensor in a top view.

FIG. 4 shows the sensor of FIG. 1 inserted into the housing of FIG. 3 in a view counter to the insertion direction.

FIG. 5 shows another example of a sensor in a first side view together with two halves of an injection mold for manufacturing the sensor.

FIG. 6 shows another housing for inserting the sensor.

FIG. 7 shows the sensor of FIG. 5 inserted into the housing of FIG. 6 in a view counter to the insertion direction.

DETAILED DESCRIPTION

FIG. 1 shows a sensor having a sensor body 3. The sensor body 3 is made by injection molding. The plastics considered for injection molding are, for example, PVC, PP or also polyamide. Lockable arms 4, 9 are located on opposite sides of the sensor body 3, with an encoding element 5 being located on the right lockable arm 4. The encoding element 5 is on the outside of the right lockable arm 4. The encoding element 5 has the shape of a protruding rib. A border 12 is provided on the front end of the encoding element 5, as seen from the insertion direction 7. This border 12 runs perpendicular to the insertion direction 7 and in the flexing direction 11 of the right lockable arm 4. Between the lockable arms 4, 9 and the sensor body 3, a free space 6 is provided, in each instance, that gives the lockable arms 4, 9 room for flexing toward the inside. The lockable arms 4, 9 have an outer edge 10 running perpendicular to the insertion direction 7 toward the inside, towards the sensor body 3. On the surface of the sensor body 3, end stops 13 are provided, which limit the flexing range of the lockable arms 4, 9. There are recesses 14 on the back ends of the lockable arms 4, 9 as seen from the insertion direction 7, which are able to accommodate the edge 15 of the bore 1 of a housing 2 according to FIG. 3. A sensor element 16 is located in a cavity 26 in the front end of the sensor body 3 as seen from the insertion direction. This sensor element 16 may, for example, be an NTC temperature sensor. A contacting device 17 is provided on the opposite end of the sensor body 3, which contacting device is connected with the sensor element 16 in an electrically conductive way. The contacting device 17 may, for example, be a plug or also a terminal contact. A flange 18 is provided between the lockable arms 4, 9 and the contacting device 17, which further seals the housing opening after the insertion of the sensor into a housing.

FIG. 2 shows the sensor of FIG. 1 in a further side view. FIG. 2 shows, above all, the mold parting line 8 at which two molds for injection molding of the sensor body 3 meet each other. FIG. 5 provides additional information regarding two examples of molds for molding a sensor.

FIG. 3 shows a housing 2 with a bore 1. The bore 1 has two narrow sides 19, 20. On one of the narrow sides 20, an encoding recess 21 in the form of a half-round hole is provided. The encoding element 5 of FIG. 1 is to be inserted into this hole or encoding recess 21 to ensure that the sensor has the correct position in bore 1 of housing 2.

The sensor of FIG. 1, inserted into the housing 2 of FIG. 3, is shown in FIG. 4. The encoding element 5 is, as shown in FIG. 2, arranged in the mold parting plane of the two molds used in the manufacture of the sensor. The molding parting plane is defined by the mold parting line 8. The encoding element 5 is therefore located in the center of the lockable arm 4. Accordingly, the encoding recess 21 is located midway on the narrow side 20 of bore 1. According to FIG. 4, the encoding element 5 is inserted into the encoding recess 21 of the housing.

FIG. 5 shows another sensor in a side view. The sensor according to FIG. 5 essentially corresponds to the sensor of FIG. 2, with the distinction that the encoding element 5 no longer extends along the plane defined by the mold parting line 8. Instead, the encoding element 5 is offset laterally to this plane. FIG. 5 also shows two halves 22, 23 of an injection mold in a schematic cross section. The right injection mold 22 has a projection 25 in a first plane (shown as a broken line) suitable for creating the cavity 26 in which the sensor element 16 is located. The first half 22 of the injection mold also has a second projection 24 suitable for creating a free space 6 between a lockable arm 4 and the sensor body 3. FIG. 5 shows that the sensor can be manufactured by injection molding by simply joining the two halves 22, 23 of an injection mold. No additional inserts or slide valves from outside into the injection mold are needed, making it possible to manufacture the sensor in especially easy and inexpensive manner.

FIG. 6 shows a housing according to FIG. 3, with the distinction that the encoding recess 21 is not located in the center of the narrow side 20 but in the lower area of the narrow side 20.

The positioning of the encoding recess 21 corresponds to the positioning of the encoding element 5 of FIG. 5, resulting in the sensor arrangement shown in FIG. 7 by inserting the sensor of FIG. 5 into the housing 2 of FIG. 6, where the encoding element 5 positioned outside the center is inserted into the encoding recess 21 positioned outside the center.

The invention described here is not limited to temperature sensors or to sensor bodies manufactured by injection molding, but can be used for any type of sensors.

What is claimed is:

1. A sensor for insertion into a bore of a housing, the sensor comprising:
    a sensor body;
    a lockable arm on the sensor body, the lockable arm being flexible; and
    an encoding element on the lockable arm.

2. The sensor of claim 1, wherein the lockable arm is on a side of the sensor body that is more narrow than another side of the sensor body.

3. The sensor of claim 1, wherein the lockable arm and the sensor body define a space, the lockable arm being flexible inward toward the sensor body across the space.

4. The sensor of claim 1, wherein the lockable arm comprises an outer edge running inward toward the sensor body and at a slant relative to a direction in which the sensor is inserted into the bore.

5. The sensor of claim 1, wherein the sensor comprises an integrated component that is manufactured by injecting plastic into a mold comprised of two halves.

6. The sensor of claim 5, wherein a point at which the two halves intersect defines a mold parting line, the mold parting line running substantially in a plane in which the lockable arm flexes.

7. The sensor according to claim 6, wherein the encoding element is substantially parallel to a plane of the mold parting line.

8. The sensor of claim 6, wherein the encoding element is substantially in a plane of the mold parting line.

9. The sensor of claim 1, wherein the encoding element is on an outside of the lockable arm relative to the sensor body.

10. The sensor of claim 1, further comprising:
    a second lockable arm on a side of the sensor body that is opposite to a side of the sensor body having the lockable arm.

11. The sensor of claim 1, wherein the encoding element comprises a projection that protrudes from the sensor.

12. The sensor of claim 11, wherein the encoding element has a border running substantially perpendicular to a direction in which the sensor is inserted into the bore and in a direction that the lockable arm flexes.

13. The sensor of claim 1, further comprising:
    an end stop on the sensor body that limits a range of flexibility of the lockable arm.

14. The sensor of claim 1, wherein, from a longitudinal perspective, the encoding element protrudes from an outline of the sensor body and the lockable arm even if the lockable arm is pressed fully inward toward the sensor body.

15. The sensor of claim 1, wherein an end of the lockable arm has a recess that accommodates an edge of the housing.

16. The sensor of claim 1, wherein the lockable arm extends from the sensor body counter to a direction in which the sensor is inserted into the housing.

17. The sensor of claim 1, further comprising:
    a sensor element at a front end of the sensor body, the front end being a part of the sensor that is inserted first into the housing; and
    a contacting device for connecting to cables, the contacting device being at a back end of the sensor body, the back end being inserted into the housing after the front end;
    wherein the sensor element is electrically connected to the contacting device.

18. The sensor of claim 17, further comprising:
    a flange between the lockable arm and the contacting device.

19. A sensor arrangement, comprising:
    a sensor comprising:
        a sensor body;
        a lockable arm on the sensor body, the lockable arm being flexible; and
        an encoding element on the lockable arm; and
    a housing that has a bore with two sides, one of the sides having a recess, the sensor being inside the bore such that the encoding element is inside the recess and such that the lockable arm locks to an edge of the housing.

20. A method for manufacturing a sensor comprised of a sensor body, a lockable arm on the sensor body, the lockable arm being flexible, and an encoding element on the lockable arm, the method comprising:
    injecting plastic into a mold comprised of two halves, the mold having a projection integrated into at least one of the two halves that forms a space between the lockable arm and the sensor body.

* * * * *